US009720965B1

(12) United States Patent
Miskie

(10) Patent No.: US 9,720,965 B1
(45) Date of Patent: Aug. 1, 2017

(54) BOOKMARK AGGREGATING, ORGANIZING AND RETRIEVING SYSTEMS

(71) Applicant: Benjamin A Miskie, Santa Monica, CA (US)

(72) Inventor: Benjamin A Miskie, Santa Monica, CA (US)

( * ) Notice: Subject to any disclaimer, the term of this patent is extended or adjusted under 35 U.S.C. 154(b) by 102 days.

(21) Appl. No.: 14/462,539

(22) Filed: Aug. 18, 2014

Related U.S. Application Data

(60) Provisional application No. 61/867,028, filed on Aug. 17, 2013.

(51) Int. Cl.
*G06F 17/30* (2006.01)

(52) U.S. Cl.
CPC .. *G06F 17/30451* (2013.01); *G06F 17/30395* (2013.01); *G06F 17/30554* (2013.01); *G06F 17/30884* (2013.01)

(58) Field of Classification Search
CPC .............. G06F 17/30884; G06F 17/30451
USPC ........................................ 707/722, 736, 748
See application file for complete search history.

(56) References Cited

U.S. PATENT DOCUMENTS

| 8,024,324 | B2 | 9/2011 | Amitay et al. |
| 8,135,725 | B2 | 3/2012 | Schachter |
| 8,346,764 | B1 | 1/2013 | Rosenoff et al. |
| 8,364,718 | B2 | 1/2013 | Kirby |
| 8,490,049 | B2 | 7/2013 | Bouillet et al. |
| 2002/0033847 | A1* | 3/2002 | Masthoff ........... G06F 17/30884 715/776 |
| 2008/0282198 | A1* | 11/2008 | Brooks .................. G06Q 10/10 715/854 |
| 2009/0198675 | A1 | 8/2009 | Mihalik et al. |
| 2009/0327271 | A1 | 12/2009 | Amitay et al. |
| 2010/0010982 | A1 | 1/2010 | Broder et al. |
| 2010/0049766 | A1 | 2/2010 | Sweeney et al. |
| 2010/0114907 | A1* | 5/2010 | Kirby ................. G06F 17/30002 707/748 |
| 2010/0169756 | A1* | 7/2010 | Bonchi ............. G06F 17/30884 715/206 |
| 2011/0246482 | A1* | 10/2011 | Badenes ........... G06F 17/30011 707/748 |
| 2013/0124541 | A1 | 5/2013 | Kirby |
| 2013/0275359 | A1 | 10/2013 | Sweeney et al. |

OTHER PUBLICATIONS

"Guided Search hits the web!", blog post from http://blog.pinterest.com/post/88472890774/guided-search-hits-the-web (downlaoded on Aug. 8, 2014).

(Continued)

*Primary Examiner* — Chelcie Daye

(57) ABSTRACT

A system to assist users to bookmark online content by storing a collection of bookmarks among all the users, classifying the bookmarks by tags submitted by the users, searching the bookmarks by user specified tags returning only the bookmarks actually collected by the user, and allowing narrowing of the search by specifying additional tags. Further embodiments include limiting searching by the classification done only by the user, aggregating bookmarks across user devices and online user publications.

20 Claims, 9 Drawing Sheets

(56) References Cited

OTHER PUBLICATIONS

"Guided Search: a new way to find what you're looking for", blog post from http://blog/pinterest.com/post/83772264616/guided-search-a-new-way-to-fnid-what-youre-looking (downloaded on Aug. 8, 2014).

"Find People Faser with Linkedin's new faceted search", article from https://m.facebook.com/notes/linkedin/find-people-faster-with-linkedins-new-faceted-search/2015463 (downloaded on Aug. 8, 2014).

"Inside Look: Designing LinkedIn Faceted Search", article from http://blog.linkedin.com/2010/03/05/designing-linkedin-facted-search/.

"Introducing Graph Search", article from http://www.facebook.com/about/graphsearch.

\* cited by examiner

BOOKMARK AGGREGATING, ORGANIZING AND RETRIEVING SYSTEMS

BACKGROUND

Applicant is not aware of any system capable of assisting users to store large quantities of bookmarks for handy retrieval by repeated narrowing searching through tags organizing the bookmarks, where the tagging may be suggested by a tags provided by a collective group of users.

OBJECTS AND FEATURES

A primary object and feature of the present invention is to provide a system for convenient storage and retrieval of a user's bookmarks.

It is a further object and feature of the present invention to provide assistance in classification by suggesting tags.

It is yet a further object and feature of the present invention to automate collection of bookmarks by collecting from a user's online publications.

A further primary object and feature of the present invention is to provide such a system that is safe, efficient, trustworthy, inexpensive and handy. Other objects and features of this invention will become apparent with reference to the following descriptions.

CROSS REFERENCE TO RELATED APPLICATIONS

The present application is related to prior provisional application Ser. No. 61/867,028 filed Aug. 17, 2013 the contents of which are incorporated herein by this reference and are not admitted to be prior art with respect to the present invention by the mention in this cross-reference section.

SUMMARY

Disclosed is a system to assist users to bookmark online content by storing a collection of bookmarks among all the users. The system further classifies the bookmarks by tags submitted by the users. The system allows searching the bookmarks by user specified tags returning only the bookmarks actually collected by the user and it allows narrowing of the search by specifying additional tags. Further disclosure includes limiting searching by the classification done only by the user, aggregating bookmarks across user devices and online user publications.

DETAILED DESCRIPTION

The present Bookmark Aggregating, Organizing and Retrieving Systems will now be discussed in detail with regard to the attached drawing figures, which were briefly described above. In the following description, numerous specific details are set forth illustrating the Applicant's best mode for practicing the Bookmark Aggregating, Organizing and Retrieving Systems and enabling one of ordinary skill in the art to make and use the Bookmark Aggregating, Organizing and Retrieving Systems. It will be obvious, however, to one skilled in the art that the present Bookmark Aggregating, Organizing and Retrieving Systems may be practiced without many of these specific details. In other instances, well-known software methods, software engineering considerations, user interface design considerations and other details have not been described in particular detail in order to avoid unnecessarily obscuring this disclosure.

In a preferred embodiment, a computer implemented method facilitates how tags are displayed to a user through a series of tag selection steps that will help the user quickly refine what they are looking for. The method uses an approach that displays a reduced and more relevant group of tags for the user to choose from with each iterative cycle based on the user's tag selections during each prior iteration. This allows for a large collection of bookmarks to be aggregated, organized and then retrieved.

Figure 1:
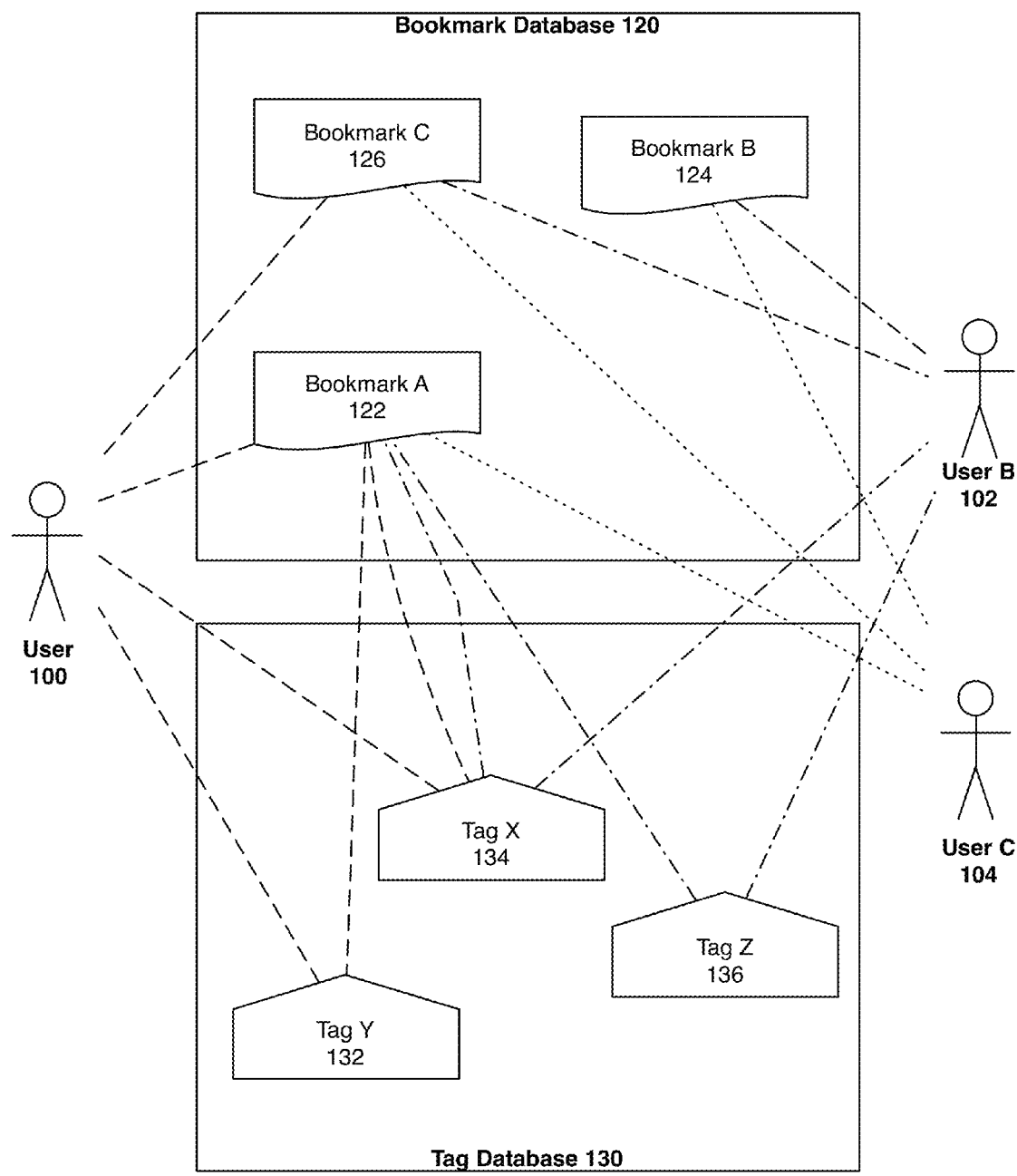
FIG. 1 shows a diagrammatic view that illustrates the relationships between users, bookmarks, and tags, according to an embodiment of the invention.

FIG. 1 shows a diagrammatic view that illustrates the relationships between users, bookmarks, and tags, according to an embodiment of the invention. A collection of users 100, 102, and 104 share a system for aggregating, organizing and retrieving bookmarks. User 100 has collected bookmark A 122 and bookmark C 125, as shown by long-dash lines. User B has collected bookmark B 124 and bookmark C 126, as shown by alternating long-dash/short-dash lines. User C has collected all the bookmarks, as shown by short-dash lines. The system could contain a large number of bookmarks.

Considering bookmark A 122, User 100 has classified using tag X 134 and tag Y 132, as shown by long-dash lines. User 102 has classified bookmark A 122 using Tag X 134 and Tag Z 136. When User C collects bookmark A 122, he does not classify or has not yet classified the bookmark. The system could contain a large number of tags. This shows how to store a collection of bookmarks for the collection of users, where the collection of bookmarks are classified by a collection of tags submitted by the collection of users.

If User C 104 desired to tag Bookmark A 122, the system may suggest tag X 134, Y 132, or Tag Z 136, because these tags were previously selected by other users. If the system contained other tags, they would not be suggested. This shows how to suggest to the user to tag a bookmark from the group of bookmarks using the collection of tags that already classify the bookmark. Further it demonstrates how tags can be stored for a group of bookmarks classified by a group of tags specified by the user. It also shows how to suggest at least two tags and how to store at least two tags for each bookmark.

The term "item" refers to any kind of object which may found by bookmarks (e.g. urls, media files, etc.) accessible by a computer. In one example, an item may correspond to something that can accessed by a computer, for example, things to be acquired (e.g., purchased) by the user, such as media content (a book, a musical piece, etc.), a tangible article (e.g., an automobile, a camera, etc.), a service, downloadable digital content of any nature. The system may electronically describe an item using an "item record". In other cases, the object being described with tags is an informational item (such as a website that caters to a certain theme), there being no underlying physical object associated with the informational item. In brief, then, the term "item" is to be liberally and generally construed as used herein. In some alternate embodiments, items or particular kinds of items could be tagged and classified instated of bookmarks.

The term "tag" refers to a unstructured, non-hierarchical keyword or term assigned to an item. It is a form of metadata that can help describe an item. It may serve as a facet in a faceted search. Tags are selected by the user; this type of taxonomy may sometimes be called a folksonomy.

Figure 2A:
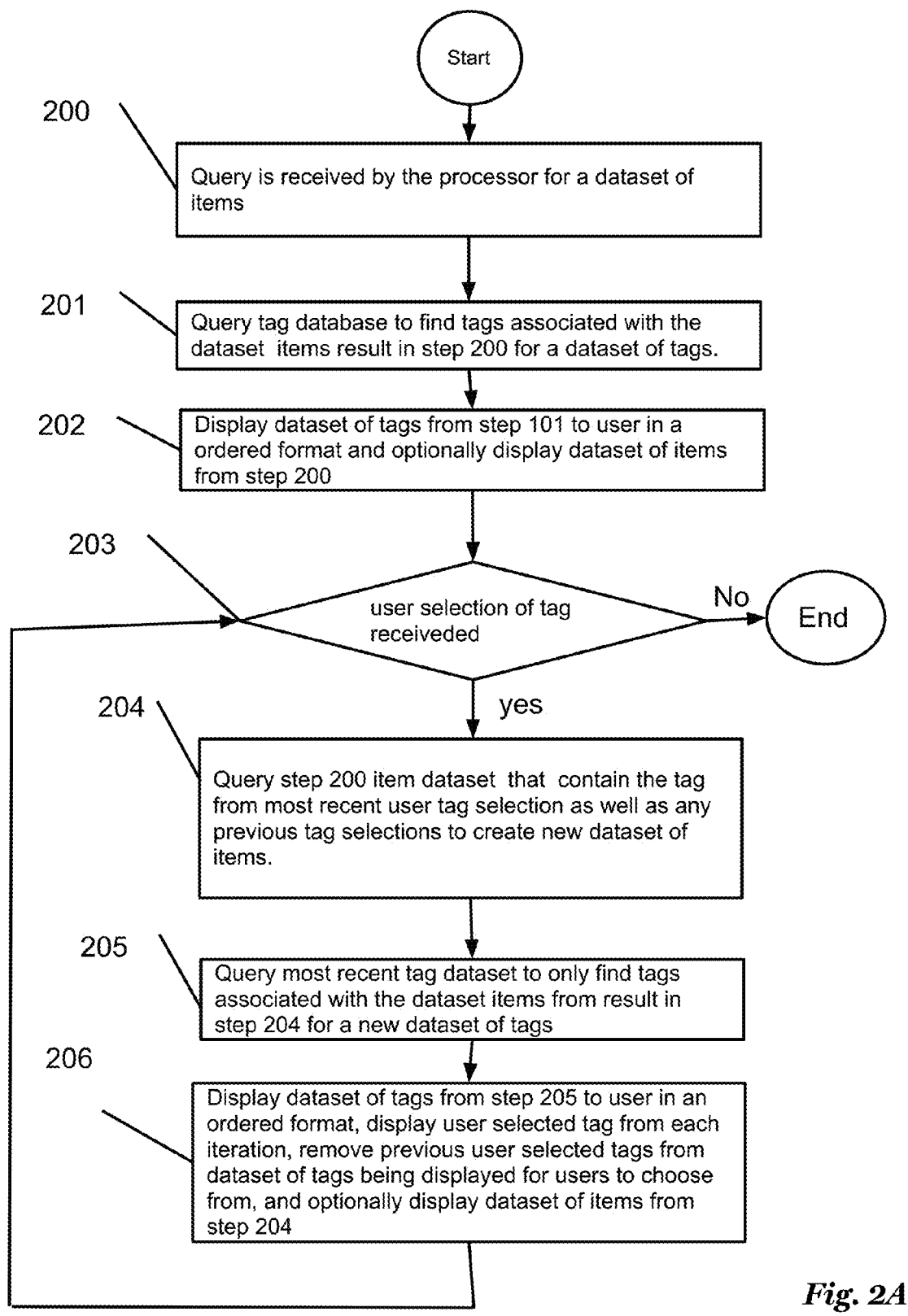
FIG. 2a shows a flow chart view illustrating the steps of how the computer can processes query input by the user according to one embodiment of the system using an example of a server side execution method.
Figure 2B:
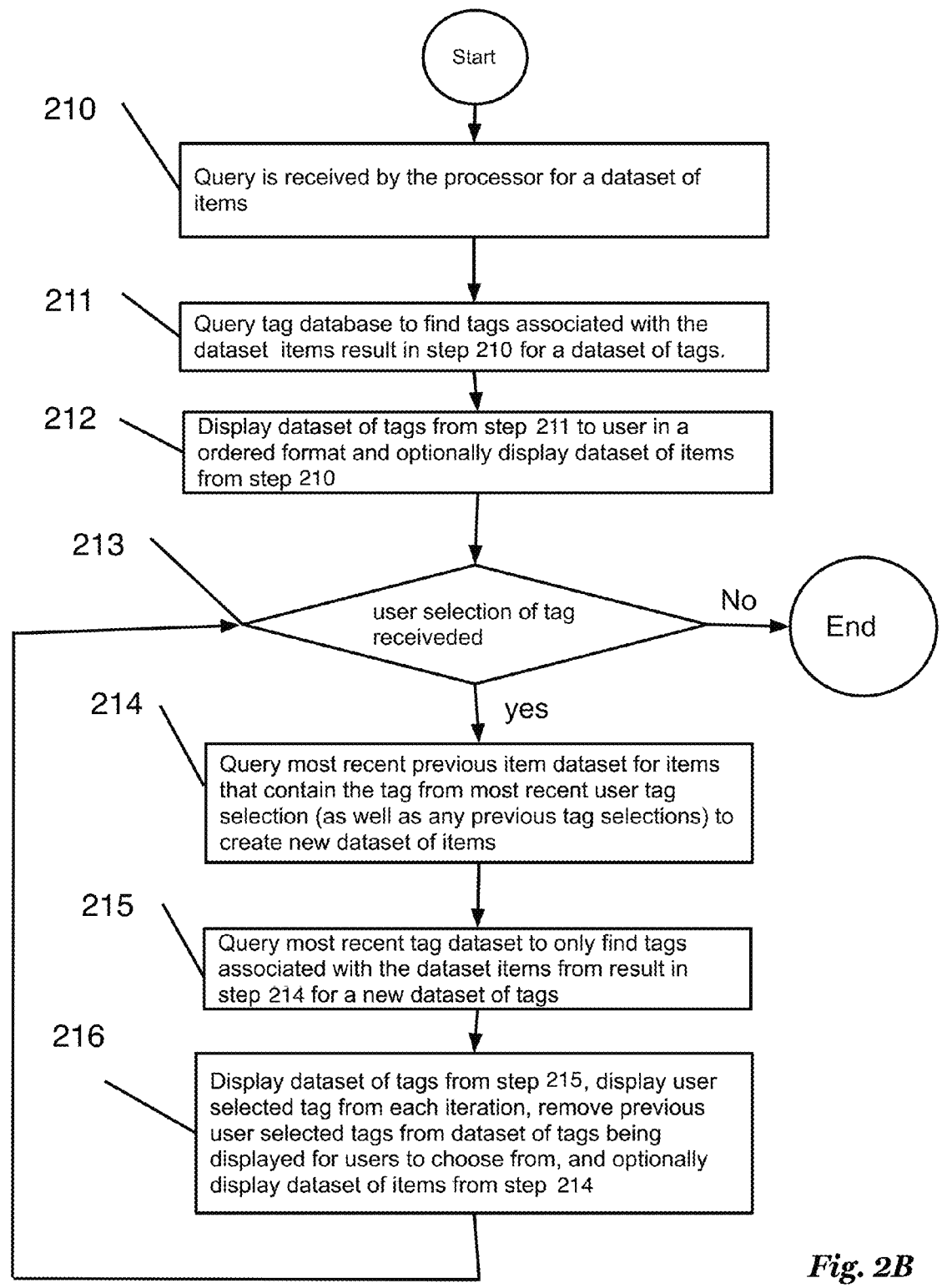
FIG. 2b shows a flow chart view illustrating the steps of how the computer can processes query input by the user according to one embodiment of the system using an example of a client side execution method.

FIG. 2b shows a flow chart view that illustrating the steps of how the computer can processes query input by the user according to one embodiment of the system using an example of a client side execution method, that is, a computer implemented process of how the system interacts with the user who is looking to find an item or items in a dataset. A dataset of items (210) is presented to the system as a starting point. The system is configured to present items and datasets by multiple means. For example, the system may receive an input query from a user and look that query up in a database to generate a dataset of items (210). In another example, the system may automatically generate a dataset of items (210) based on user preferences, previous input received by a user, or by other means. The individual items in this starting dataset (210) also have associated tags. The system will then extract the tags from the dataset of items (210), and create a separate dataset of tags(2111). The dataset of items(210) and the dataset of extracted tags(211) from the dataset of items(210) are presented to the user(212) for example on the display screen of a computer (e.g. a desktop computer, a laptop computer, a tablet computer, a smartphone, a wearable computer such as Google glasses, etc.). In an alternative embodiment, the system may comprise a filter such as a tolerance filter at step (211) or in another appropriate location. The tolerance filter may be configured to only show the most appropriate tags (e.g. only show associated tags that have been used with an item by the user or other users or some other form of popularity or filter). In an alternative embodiment, the system may comprise a filter such as an ordering filter at step (211) or in another appropriate location. In one embodiment, the ordering filter may be configured to order the tags based on popularity by a user.

The system will receive the user tag selection(213) from the presented tags in step(212) which will then query the most recent previous dataset of items that contain the tag from most recent user tag selection (as well as any previous tag selections) to create new dataset of items (214).

The system will then query the most recent tag dataset to only find tags associated with the dataset items from result 214 for a new dataset of tags(215).

The system will then display a dataset of tags(215) to user, and in one embodiment will display the user selected tag from each iteration. In one embodiment, the system will disable previously user selected tag from dataset of tags being selected in future iterations by some combination or singular method of greying out, hiding, or repositioning the user's selected tags from previous iterations, and optionally display the dataset of items from step 214 (216).

The process can continue to iterate indefinitely back to step 213 until the user decides to no longer make tag selections.

Each iteration will preferably display an equal or reduced dataset of items, and an equal or reduced dataset of tags, making it progressively easier for the user to scan and to find the item or items they are looking for.

FIG. 2a shows a flow chart view illustrating the steps of how the computer can processes query input by the user according to one embodiment of the system using an example of a server side execution method, that is, a process of how the system interacts with the user who is looking to find an item or items in a dataset.

A dataset of items(200) is presented to the system as a starting point. The system is configured to present items and datasets by multiple means. For example, the system may receive an input query from a user and look that query up in a database to generate a dataset of items(200). In another example, the system may automatically generate a dataset of items(200) based on user preferences, previous input received by a user, or by other means. The individual items in this starting dataset(200) also have associated tags. The system will then extract the tags from the dataset of items (200), and create a separate dataset of tags(201). The dataset of items(200) and the dataset of extracted tags(201) from the dataset of items(200) are presented to the user(202). In an alternative embodiment, the system may comprise a filter such as a tolerance filter at step (201) or in another appropriate location. The tolerance filter may be configured to only show the most appropriate tags (e.g. only show associated tags that have been used with an item by the user or other users or some other form of popularity or filter as may be common in the art). In an alternative embodiment, the system may comprise a filter such as an ordering filter at step (201) or in another appropriate location. In one embodiment, the ordering filter may be configured to order the tags based on popularity by a user.

The system will receive the user tag selection(203) from the presented tags in step(202) which will then query the dataset of items from step 200 that contain the tag from most recent user tag selection (as well as any previous tag selections) to create new dataset of items (204).

The system will then query the most recent tag dataset to only find tags associated with the dataset items from result 204 for a new dataset of tags(205).

The system will then display a dataset of tags(205) to user, and in one embodiment will display the user selected tag from each iteration. In one embodiment, the system will disable previously user selected tag from dataset of tags being selected in future iterations by some combination or singular method of greying out, hiding, or repositioning the user's selected tags from previous iterations, and optionally display the dataset of items from step 204 (206).

The process can continue to iterate indefinitely back to step 203 until the user decides to no longer make tag selections.

Each iteration will display an equal or reduced dataset of items, and an equal or reduced dataset of tags, making it easier for the user to find the item or items they are looking for.

Figure 3A:
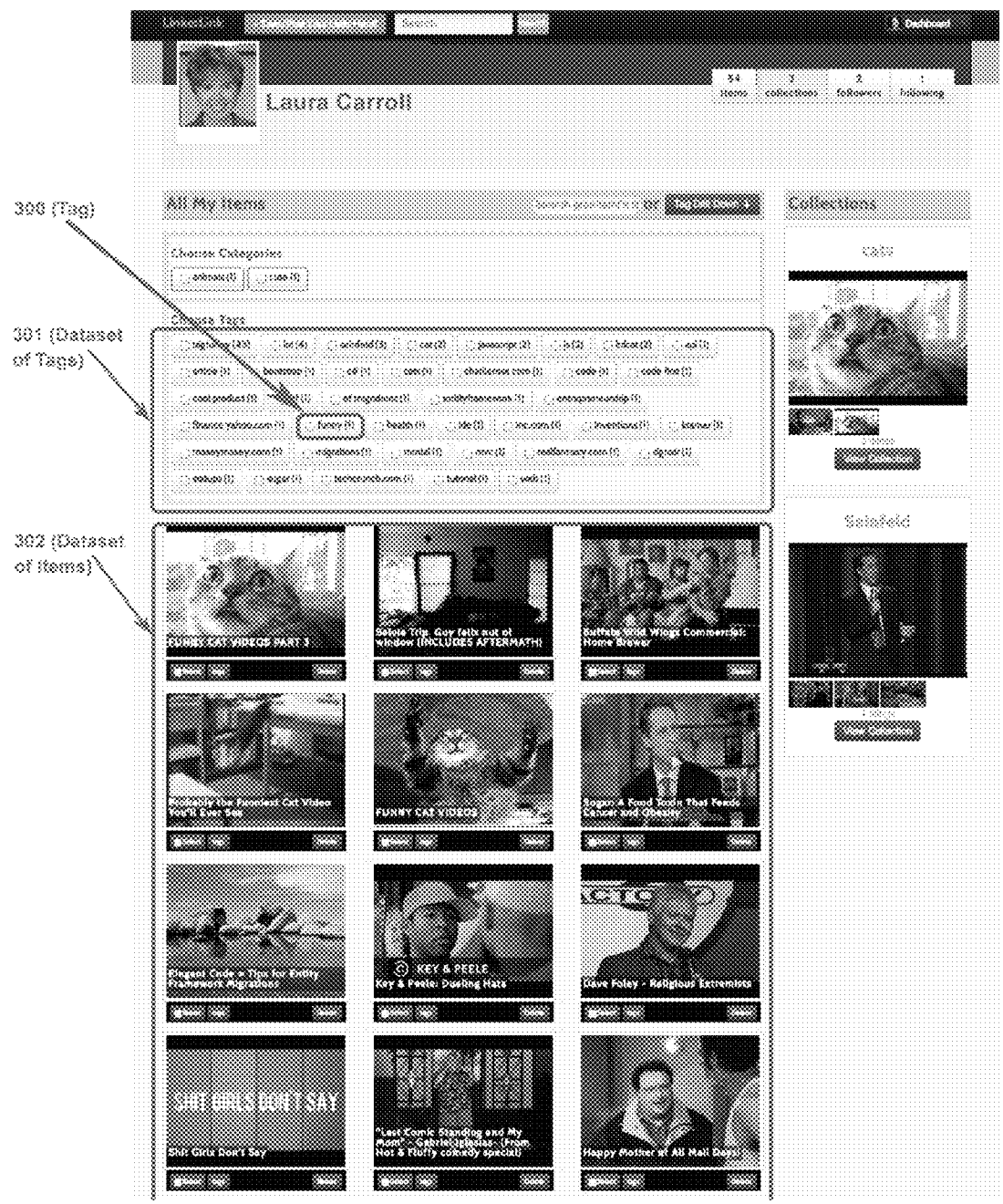
FIGS. 3a, 3b and 3c shows a series of computer screen shot views illustrating examples of potential workflows from user perspective.
Figure 3B:
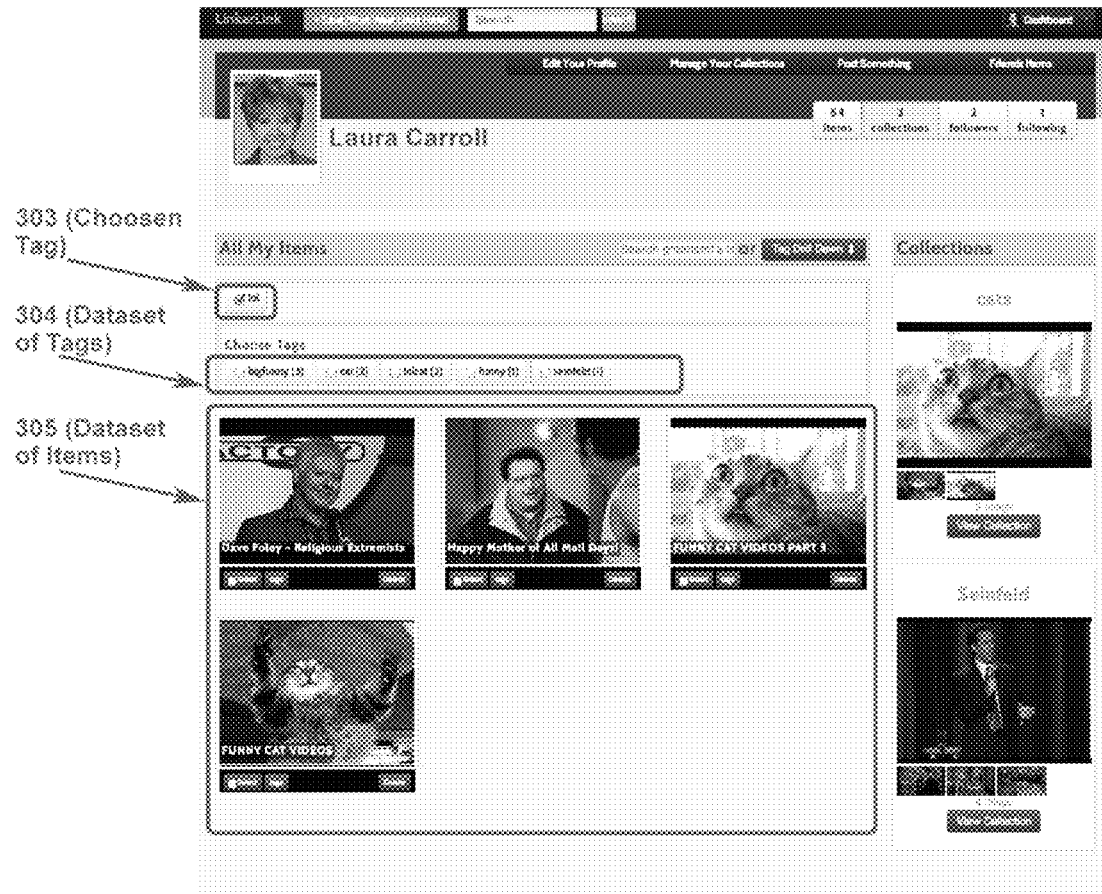
Figure 3C:
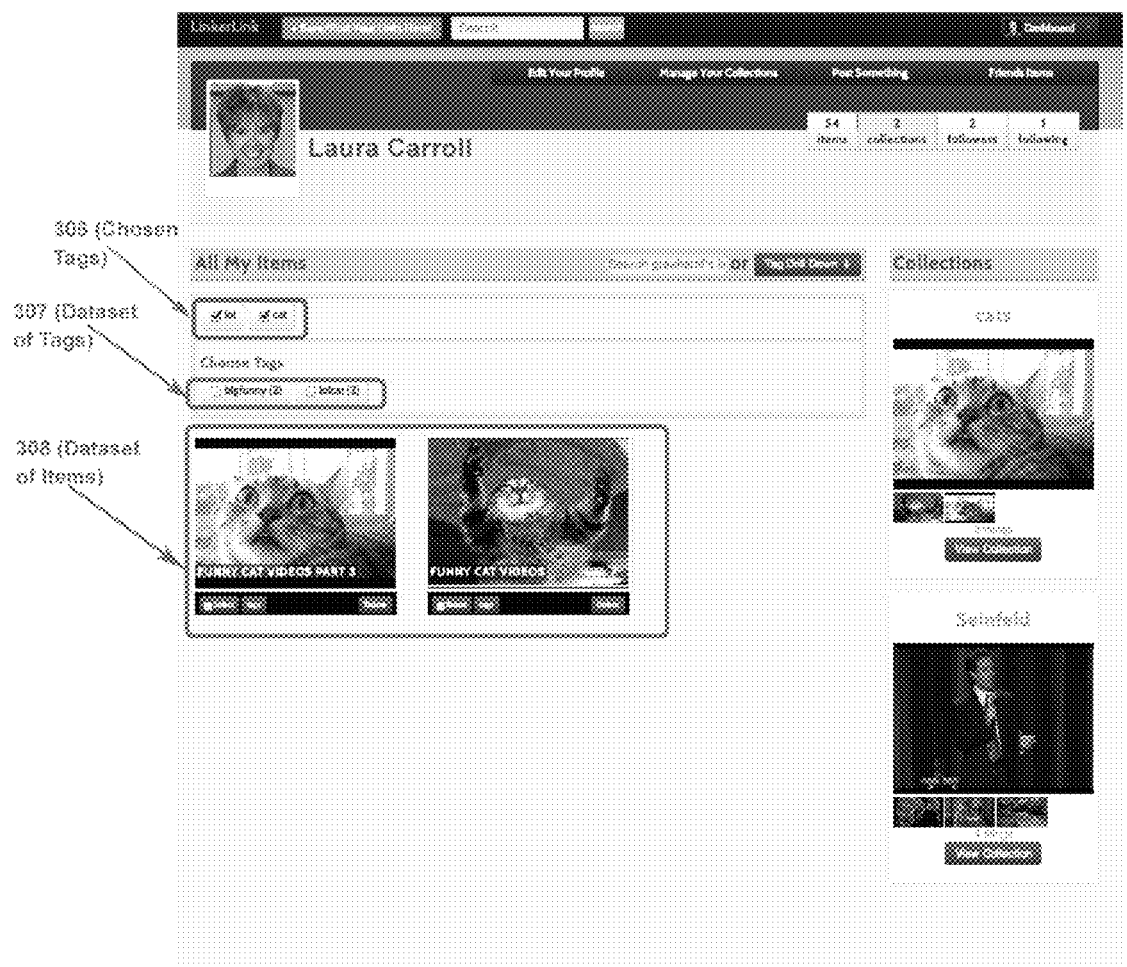

FIGS. 3a, 3b and 3c shows a series of computer screen shot views illustrating examples of potential workflows from user perspective, that is, a exemplary computer implemented method from the user perspective. In this example, the user is presented with a dataset of tags (301) and a dataset of items (302). The dataset of tags (301) is derived from only displaying the tags that are associated with the dataset of items (302). After the user selects a tag, the user is presented with a reduced subset of tags(304) and a reduced subset of items (305). The new dataset of items (305) is derived from displaying only the items from the dataset of items (302) that contain that are tagged with the selected tag. This subset of tags (304) is derived from only displaying the tags that are associated with the dataset of items (305).

The user can continue to iterate the process with additional tag selections.

In FIG. 3a, the user is first presented with the user's entire collection of bookmarks, which are shown here, graphically as photographs (302). The user wants to find her funny item that is about cats, but she has many things to sort through.

By selecting a tag, in the tag selection box 301, the user is presented with FIG. 3b, which shows only those photographs (representing the bookmarks), that have been classified with the selected tag. In box 304, the user is also presented with the other tags that are associated with the found, displayed bookmarks. In FIG. 3c, the user has selected a 2nd tag, and has further narrowed the display of bookmarks to just two photographs. This example shows searching the group of bookmarks, by a user-specified tag, for found bookmarks, then displaying those found bookmarks and the found tags associated with the found bookmarks. Further, the example shows narrowing searching further by allowing the user to select one of the found tags, which causes the system to re-display the found tags and found bookmarks. Said another way, in just three clicks, the user has found a desired bookmark in a large collection of bookmarks.

In some embodiments, this example may also limit the searching to only tags selected by the user to classify his own bookmarks. In another embodiment, the user may be prompted to specify at least two tags, or at least three tags when searching. In such a system, display of bookmarks may be delayed until the request number of tags is selected.

In some embodiments, the first tag may not be clicked by the user, but rather, be a search term typed by the user. In other embodiments, each of the search terms typed by a user may be used as tags.

Figure 4:
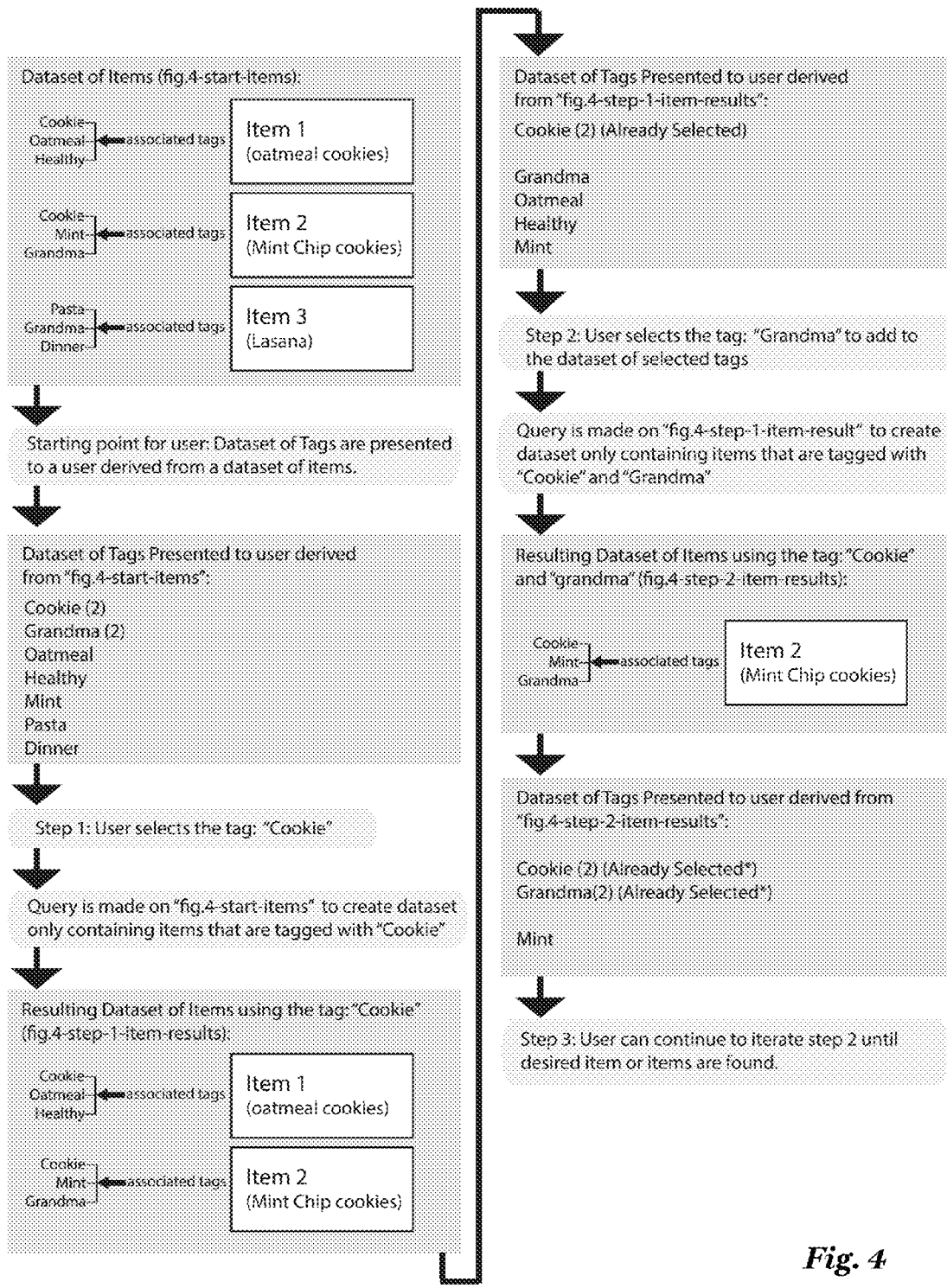
FIG. 4 shows a flowchart view illustrating the steps of how the computer can processes input by the user according to one embodiment of the system.

FIG. 4 shows a flowchart view illustrating the steps of how the computer can processes input by the user according to yet another embodiment of the system. This example shows how tags may be selected for presentation to the user from the collection of bookmarks. When a tag is selected, the dataset of bookmark items is narrowed, which narrows the tags for display, which repeats until the specific desired subset of bookmark is found.

Figure 5:
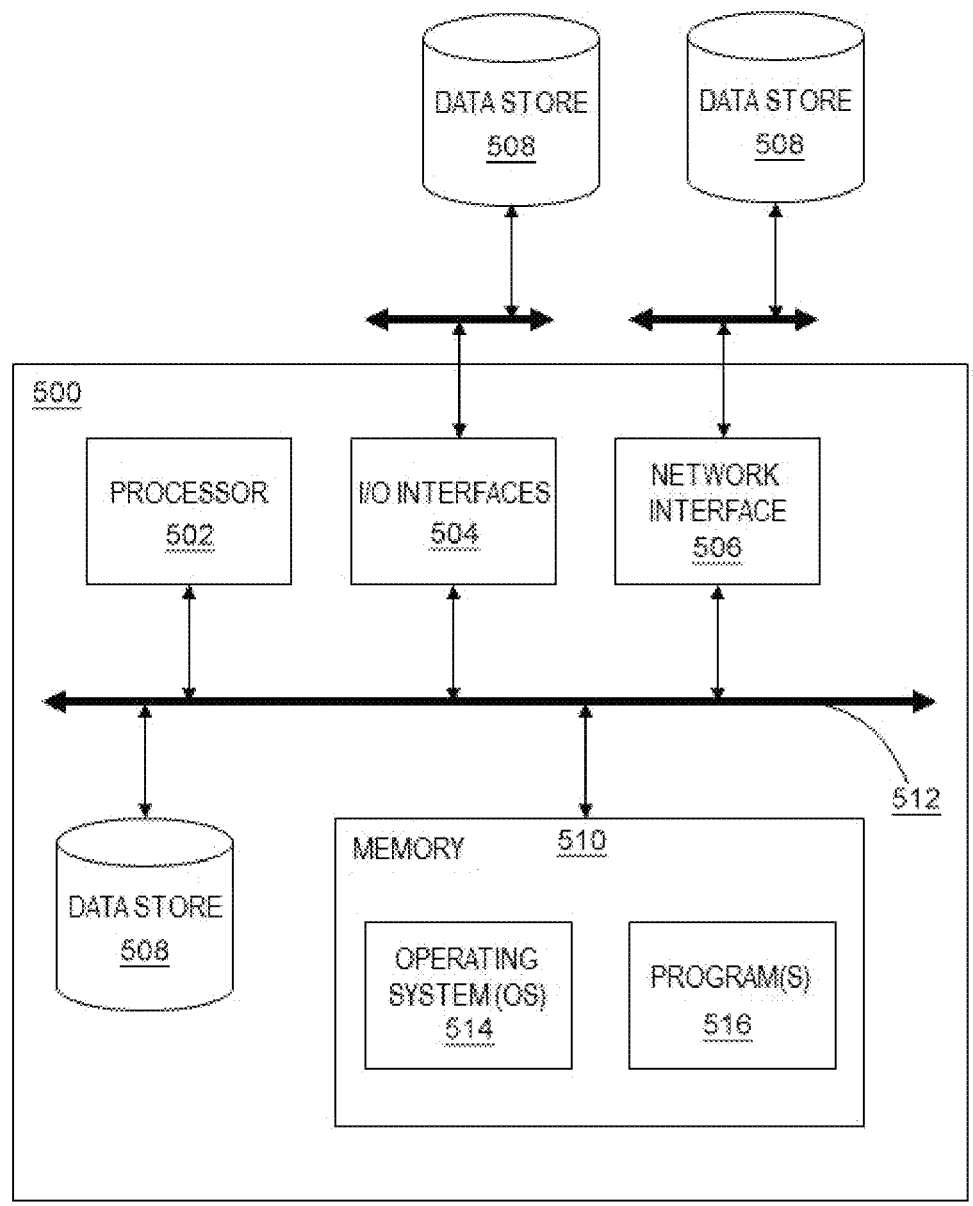
FIG. 5 shows a block diagram view illustrating the internal components of an exemplary computing device used for implementing server side execution of the method.

FIG. 5 shows a block diagram view illustrating the internal components of an exemplary computing device used for implementing server side execution of the method. A server 500 which may be used in the system or standalone. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example but not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components. User input may be provided via, for example, a keyboard, touch pad, and/or a mouse. System output may be provided via a display device and a printer (not shown). I/O interfaces 504 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 506 may be used to enable the server 500 to communicate on a network, such as the Internet, the WAN 101, the enterprise 200, and the like, etc. The network interface 506 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500 such as, for example, an internal hard drive connected to the local interface 512 in the server 500. Additionally in another embodiment, the data store 508 may be located external to the server 500 such as, for example, an external hard drive connected to the I/O interfaces 504 (e.g., SCSI or USB connection). In a further embodiment, the data store 508 may be connected to the server 500 through a network, such as, for example, a network attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another, but can be accessed by the processor 502. The software in memory 510 may include one or more software programs, each of which includes an ordered listing of executable instructions for implementing logical functions. The software in the memory 510 may include a suitable operating system (O/S) 514 and one or more programs 516. The operating system 514 essentially controls the execution of other computer programs, such as the one or more programs 516, and provides scheduling, input-output control, file and data management, memory management, and communication control and related services. The operating system 514 may include but shall not be limited to any of Windows NT, Windows 2000, Windows XP, Windows Vista, Windows 7, Windows 8, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 516 may be configured to implement the various processes, algorithms, methods, techniques, etc. described herein.

Figure 6:
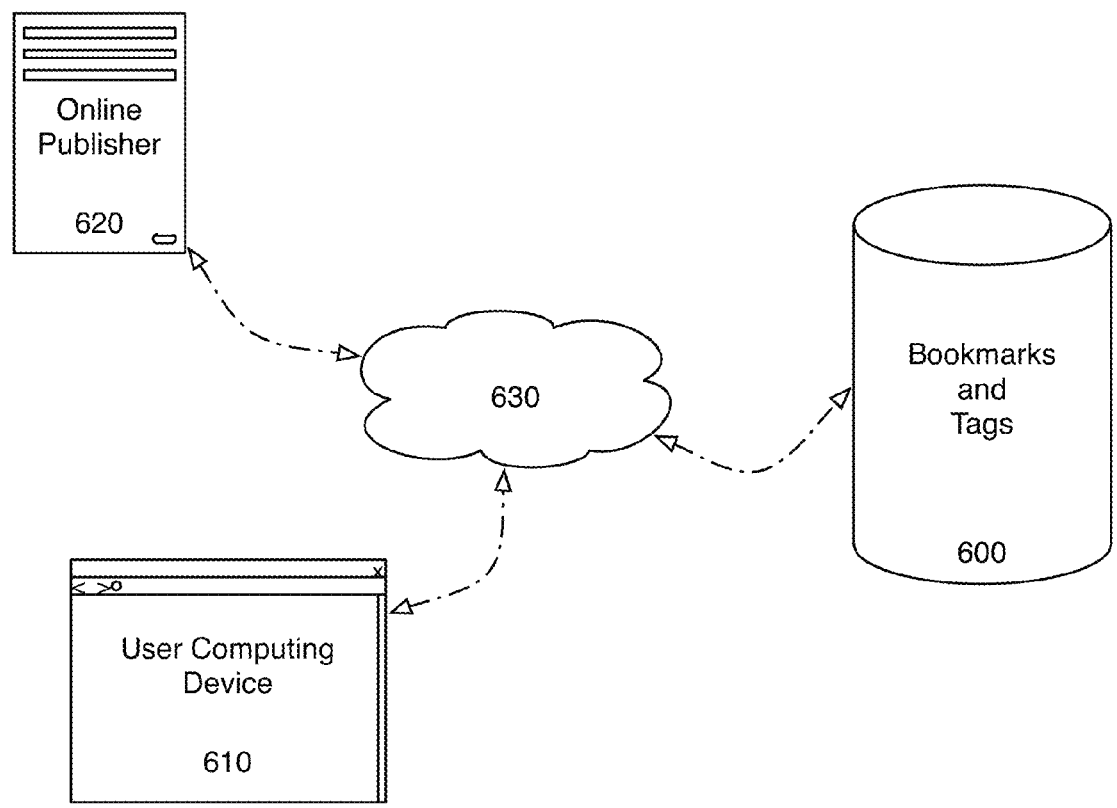
FIG. 6 shows a diagrammatic view illustrating the collection of links to create bookmarks for the user across a variety of online systems, according to an embodiment of the invention.

FIG. 6 shows a diagrammatic view illustrating the collection of links to create bookmarks for the user across a variety of online systems, according to an embodiment of the invention. Database 600 resides on a server (for example, such as a server described by FIG. 5) and contains bookmarks and tags. Database 600 may receive bookmarks and tags directly from the user through the user's web browser 610, which may run on the user's computer, mobile device or other computing platform. The bookmarks and tags would be sent from the web browser 610 to database 600 over the internet 630, as shown. In some embodiments, the web browser would send bookmarks by transmitting the bookmark using a button or plugin installed in the web browser that is preconfigured to transmit the bookmarks and tags to the database 600. This shows how receiving bookmarks may include accepting bookmarks from the user's web browser.

Alternately, database 600 could automatically collect links from the user's online publisher 620 by pulling the user's online publications across the internet 630. For example, database 600 may monitor the user's Facebook, Twitter, Pinterest, or other online social media accounts. When the system finds a new publication, any links that are included may be transformed into bookmarks. Likewise, any tags or hashtags associated with the new publication may be turned into tags to classify the links. This shows how receiving bookmarks may include collecting links from the user's online postings and any posting tag is automatically used to classify the bookmarks.

Alternately, the online publications may include blogs, tumble blogs, micro blogs, read-later sites, photo collection websites, youtube channels, etc.

The methods and system as described herein are preferably performed by a processor on a computer such as a server. In preferred embodiments, the computer is accessible by a network such as the internet and may be running in the cloud. In other preferred embodiments, the methods and system as described herein are preferably performed by a processor on a computer without the need for a network.

Although Applicant has described Applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of Applicant's invention will be apparent to those skilled in the art from the above descriptions and the below claims.

What is claimed is:

1. A computer system comprising:
one or more processors;
a memory coupled to the one or more processors, the memory encoded with a set of instructions which when executed by the one or more processors performs a process comprising:
monitoring one or more online publications associated with a user for a set of links;
automatically transforming the set of links into a set of bookmarks;
identifying a set of tags from the one or more online publications;
classifying the set of bookmarks by associating one or more tags from the set of tags with each of the set of bookmarks;
searching the set of bookmarks, by a user-specified search-tag, for any found bookmarks;
causing data associated with the found bookmarks to be displayed on a computing device associated with the user;
causing any found tags to be displayed on the computing device, wherein the found tags are associated with the found bookmarks, wherein a tolerance filter is used to identify the found tags, and wherein an ordering filter is used to order the found tags for display;
narrowing searching of bookmarks further based on user selection of one or more of the found tags to identify updated found bookmarks;
causing data associated with the updated found bookmarks to be displayed on the computing device, wherein the updated found bookmarks are classified by both the user-specified tag and the selected one or more found tags;
causing updated found tags to be displayed on the computing device, wherein the updated found tags are associated with the updated found bookmarks, wherein the tolerance filter is used to further limit the updated found tags, and wherein the ordering filter is used to further order the updated found tags.

2. The computer system of claim 1 wherein the one or more processors performs a process further comprising:
suggesting to a user to tag a bookmark from the set of bookmarks using a collection of tags that one or more other users have used already to classify the bookmark; and storing the set of bookmarks classified by a group of tags specified by the user.

3. The computer system of claim 2 wherein the one or more processors performs a process further comprising:
causing data associated with the stored set of bookmarks classified by the group of tags specified by the user to be displayed.

4. The computer system of claim 2 wherein the one or more processors performs a process further comprising:
broadening the searching of bookmarks based on user deselection of one or more found tags, wherein the deselected tag will be disabled for the duration of the user-specified search.

5. The computer system of claim 2 wherein:
the tolerance filter is configured to limit the number of found tags to a set numerical limit based on the popularity of the tag and the ordering filter is configured to order the found tags based on the popularity of the tag.

6. The computer system of claim 5 wherein:
the popularity of the tag depends on the number of times the tag has been used by other users to tag the found bookmarks and the number of times the user has used the tag.

7. The computer system of claim 6 wherein:
the numerical limit depends on the size of the screen on which information is to be displayed.

8. The computer system of claim 5 wherein:
transforming the set of links into a set of bookmarks comprises searching for media files and the set of bookmarks consists of links to media files.

9. The computer system of claim 8 wherein:
the data associated with each found bookmark that is to be displayed comprises a compressed image depicting a portion of the associated media file and each found tag is displayed as a string of characters.

10. The computer system of claim 9 wherein the one or more processors performs a process further comprising:
storing on the computing device the set of bookmarks, the tags associated with the set of bookmarks, and the display data associated with each bookmark in the set of bookmarks, so that searching may be performed by the computing device without the need for a network.

11. The computer system of claim 10 wherein the one or more processors performs a process further comprising:
displaying the media file associated with a bookmark selected by the user from the updated found bookmarks; storing the media file on the computing device; and associating the bookmark with the stored media file so that if the user selects an updated found bookmark with an associated stored media file, the computing device will display the stored media file without the need for a network.

12. The computer system of claim 11 wherein:
the data associated with updated found bookmarks is displayed immediately upon user selection of a found tag.

13. A method for searching automatically-collected bookmarks comprising:
monitoring one or more online publications associated with a user for a set of links;
automatically transforming the set of links into a set of bookmarks;
identifying a set of tags from the one or more online publications;
classifying the set of bookmarks by associating one or more tags from the set of tags with each of the set of bookmarks;
searching the set of bookmarks, by a user-specified search-tag, for any found bookmarks;
causing data associated with the found bookmarks to be displayed on a computing device associated with the user;
causing any found tags to be displayed on the computing device, wherein the found tags are associated with the found bookmarks, wherein a tolerance filter is used to identify the found tags, and wherein an ordering filter is used to order the found tags for display;
narrowing searching of bookmarks further based on user selection of one or more of the found tags to identify updated found bookmarks;
causing data associated with the updated found bookmarks to be displayed on the computing device, wherein the updated found bookmarks are classified by both the user-specified tag and the selected one or more found tags
causing updated found tags to be displayed on the computing device, wherein the updated found tags are associated with the updated found bookmarks, wherein the tolerance filter is used to further limit the updated found tags, and wherein the ordering filter is used to further order the updated found tags.

14. The method of claim 13 further comprising:
suggesting to a user to tag a bookmark from the set of bookmarks using a collection of tags that one or more other users have used already to classify the bookmark; and storing the set of bookmarks classified by a group of tags specified by the user.

15. The method of claim 14 further comprising:
causing data associated with the stored set of bookmarks classified by the group of tags specified by the user to be displayed.

16. The method of claim 14 further comprising:
broadening the searching of bookmarks based on user deselection of one or more found tags, wherein the deselected tag will be disabled for the duration of the user-specified search.

17. The method of claim 14 further wherein:
the tolerance filter is configured to limit the number of found tags to a set numerical limit based on the popularity of the tag and the ordering filter is configured to order the found tags based on the popularity of the tag.

18. The method of claim 17 wherein:
the popularity of the tag depends on the number of times the tag has been used by other users to tag the found bookmarks and the number of times the user has used the tag and the numerical limit depends on the size of the screen on which information is to be displayed.

19. The method of claim 17 wherein:
transforming the set of links into a set of bookmarks comprises searching for media files and the set of bookmarks consists of links to media files and the data associated with each found bookmark that is to be displayed comprises a compressed image depicting a portion of the associated media file and each found tag is displayed as a string of characters.

20. The method of claim 19 further comprising:
storing on the computing device the set of bookmarks, the tags associated with the set of bookmarks, and the display data associated with each bookmark in the set of bookmarks, so that searching may be performed by the computing device without the need for a network;
displaying the media file associated with a bookmark selected by the user from the updated found bookmarks; storing the media file on the computing device; and associating the bookmark with the stored media file so that if the user selects an updated found bookmark with an associated stored media file, the computing device will display the stored media file without the need for a network.

* * * * *